United States Patent [19]

Janiszewski

[11] Patent Number: 4,776,227
[45] Date of Patent: Oct. 11, 1988

[54] MOTOR VEHICLE GEARBOX

[75] Inventor: Grzegorz Janiszewski, Angered, Sweden

[73] Assignee: AB Volvo, Gothenburg, Sweden

[21] Appl. No.: 20,014

[22] Filed: Feb. 26, 1987

[30] Foreign Application Priority Data

Mar. 17, 1986 [SE] Sweden ............................ 8601247

[51] Int. Cl.⁴ .............................................. F16H 3/08
[52] U.S. Cl. ........................................ 74/331; 74/357; 74/359
[58] Field of Search ................... 74/330, 331, 356, 357, 74/359, 334, 329, 333

[56] References Cited

U.S. PATENT DOCUMENTS

| | | | |
|---|---|---|---|
| 1,453,032 | 4/1923 | Von Soden-Fraunhofen | 74/331 |
| 2,644,340 | 7/1953 | Youngren et al. | 74/330 |
| 3,769,857 | 11/1973 | Whateley | 74/330 X |
| 4,461,188 | 7/1984 | Fisher | 74/356 X |
| 4,685,343 | 8/1987 | Ehrlinger et al. | 74/359 X |

FOREIGN PATENT DOCUMENTS

| | | |
|---|---|---|
| 0433870 | 6/1984 | Sweden . |
| 439279 | 6/1985 | Sweden . |
| 0606749 | 5/1978 | U.S.S.R. . |

Primary Examiner—Leslie A. Braun
Assistant Examiner—Dwight G. Diehl
Attorney, Agent, or Firm—Young & Thompson

[57] ABSTRACT

A vehicle gear-box with an input shaft which drives two intermediate shafts, which lie in a plane offset from the input shaft and have a pair of mutually engaging gears, one of which is non-rotatably joined to the intermediate gear for the first gear speed, mounted on one of the intermediate shafts, while the other gear is freely rotatably journalled on the second intermediate shaft and lockable thereon by an engaging sleeve with a synchronizer. Reverse gear is obtained by locking the second gear to the second intermediate shaft with the intermediate gear for first being disengaged from its intermediate shaft.

2 Claims, 1 Drawing Sheet

MOTOR VEHICLE GEARBOX

The present invention relates to a motor vehicle gearbox comprising a housing with an input shaft and two intermediate shafts lying in a plane offset from the input shaft and having gears in engagement with gears on the input shaft, at least one gear of each pair of mutually engaging gears on said shafts being disengageable from its shaft.

A gear-box of this type is known by Swedish Lay-Open Print 439 279 for example. This gear-box, which is made very compact to be suited for automobiles with transverse engines, has, as do most conventional gearboxes, an intermediate gear journalled on a separate shaft for reverse.

The purpose of the present invention is to achieve a gear-box of the type described in the introduction above, in which reverse gear can be achieved without a separate intermediate shaft for reverse and to thereby achieve an even more compact design.

This is achieved according to the invention by virtue of the fact that said intermediate shafts have a pair of mutually engaging gears, one of which is drivingly coupled to a gear which transmits torque when driving in the lowest gear speed forward, and the other being freely rotatably journalled on its shaft and lockable to the shaft by clutch means to reverse the rotational direction of the shaft.

The design according to the invention eliminates the need for a separate shaft for the intermediate gear for reverse. Instead, one of the intermediate shafts is used as a reversing shaft. An exceptionally compact, simple and inexpensive design is obtained in this case if said one gear is solidly joined to the hub of the intermediate gear for the first gear speed, which hub is mounted on the intermediate shaft.

All that is then required to obtain a synchronised reverse is an extra gear with engaging sleeve and synchronising means on the second intermediate shaft. These replace the three previous gears with engaging means, thus eliminating one gear. In addition to the above-mentioned advantages improved engagement is provided as well as lower weight. A speed reduction in two steps is also obtained, which provides optimum ratio in reverse.

The invention will be described in more detail below with reference to an example shown in the accompanying drawing.

Figure 2:
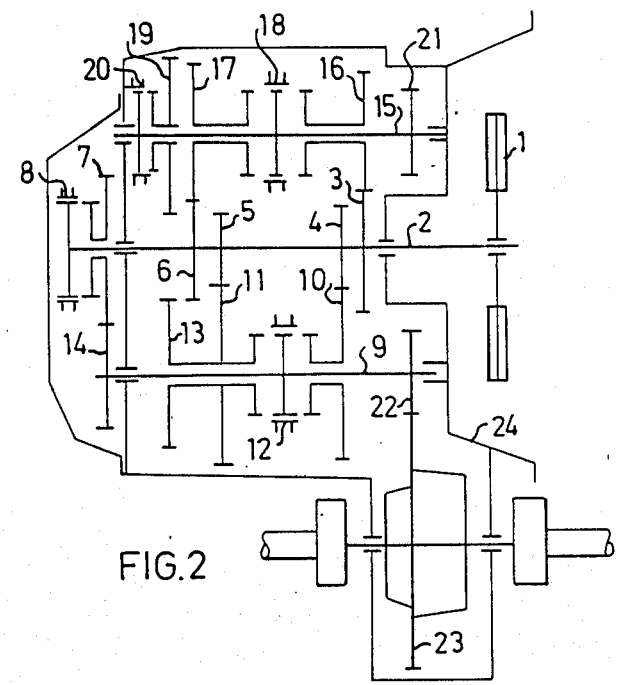
FIG. 2 shows a schematic view along the line I—I in FIG. 1.
Figure 1:
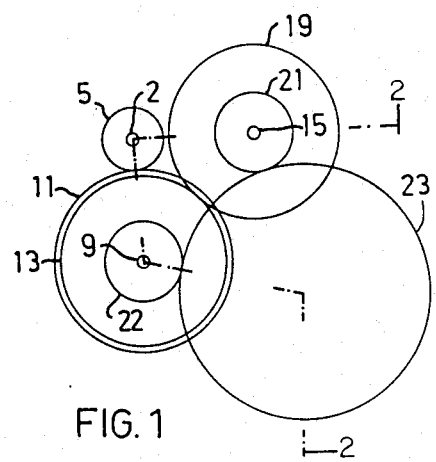
FIG. 1 shows a schematic end view of a gear-box according to the invention.

In FIG. 2, 1 indicates a disc in a clutch (not shown here). The disc is non-rotatably mounted on an input shaft 2, to which gears 3, 4, 5 and 6 are also non-rotatably mounted, for third, second, first and fourth gears. There is also a rotatably journalled intermediate gear 7 for the fifth gear speed, which is lockable to the shaft by means of an engaging sleeve 8 with synchonising means. On a first intermediate shaft 9, intermediate gears 10 and 11 are rotatably journalled and lockable to the shaft by means of an engaging sleeve 12 with synchronising means. A reversing gear 13 is solidly joined to the hub of the intermediate gear 11 for first. Gear 14 for fifth is non-rotatably mounted on the intermediate shaft 9. A second intermediate shaft 15 has rotatably journalled intermediate gears 16 and 17, which are lockable to the shaft by means of an engaging sleeve 18 with synchronising means. An intermediate gear 19 for reverse is lockable to the intermediate shaft 15 by means of an engaging sleeve 20 with synchronising means. Intermediate shafts 9 and 15 have non-rotatably mounted gears 21, 22, which engage the crown wheel 23 in a differential, the housing of which is integral with the gear-box housing 24.

When driving forward, the intermediate gear 19 is always disengaged from the shaft 15 by means of the engaging sleeve 20. Except when driving in first, the intermediate gear 11 and thus the reverse intermediate gear 13 are always disengaged from intermediate shaft 9 by means of the engaging sleeve 12. The gear 5 for first on the input shaft 2 thus drives in the neutral position gear 13, which is disengaged from the shaft and serves as an intermediate gear and the intermediate shaft 9 thus assumes the function of the separate shaft for the intermediate gear in the previously known gear-boxes. When engaging reverse, the engaging sleeve 20 is moved to the right in FIG. 2 and thus locks the reversing gear 19 to the intermediate shaft 15, which now drives, via gear 21, the ring gear 23 in the reversing direction.

By thus using the first gear speed for driving the intermediate gear 13, a high gear ratio is obtained in reverse. At the same time a common transmission step is used for gear speeds on which one places essentially the same requirements as regards torque, gear ratio, noise level etc.

I claim:

1. In a motor vehicle gear-box, comprising a housing with an input shaft and two intermediate shafts lying in a plane offset from the input shaft and said intermediate shafts each having gears in engagement with gears on the input shaft, at least one gear of each pair of mutually engaging gears on said shafts being disengageable from its shaft; the improvement in which each said intermediate shaft has a further gear; said further gear defining a pair of mutually engaging gears, one of said further gears being drivingly coupled to a coaxial gear which transmits torque when driving in the lowest forward gear speed, and the other being freely rotatably journalled on its said intermediate shaft and lockable to its shaft by clutch means to reverse the rotational direction of its shaft, each intermediate shaft having an output gear non-rotatably mounted thereon, both said output gears engaging with a common gear mounted non-rotatably on an output shaft of said gear-box which is offset from said input shaft.

2. Gear-box according to claim 1, in which said one gear is solidly joined to the hub of an intermediate gear for the first gear speed, said hub being mounted on the intermediate shaft about which said one gear turns.

* * * * *